Figure 6:
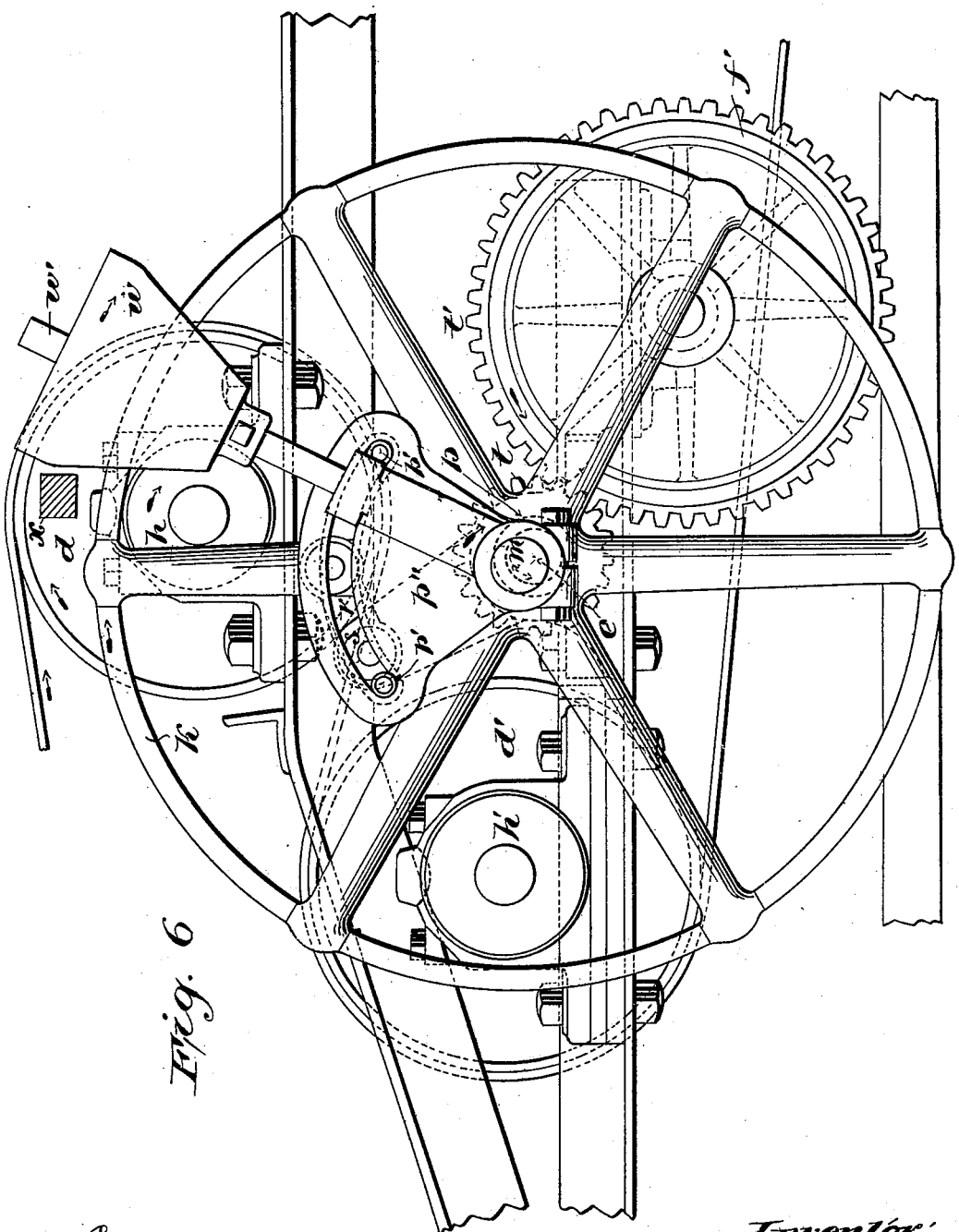

No. 673,539. Patented May 7, 1901.
J. B. HUMPHREYS.
TRIPPER OR DELIVERER FOR CONVEYING APPARATUS.
(Application filed May 24, 1900.)
(No Model.) 4 Sheets—Sheet 1.
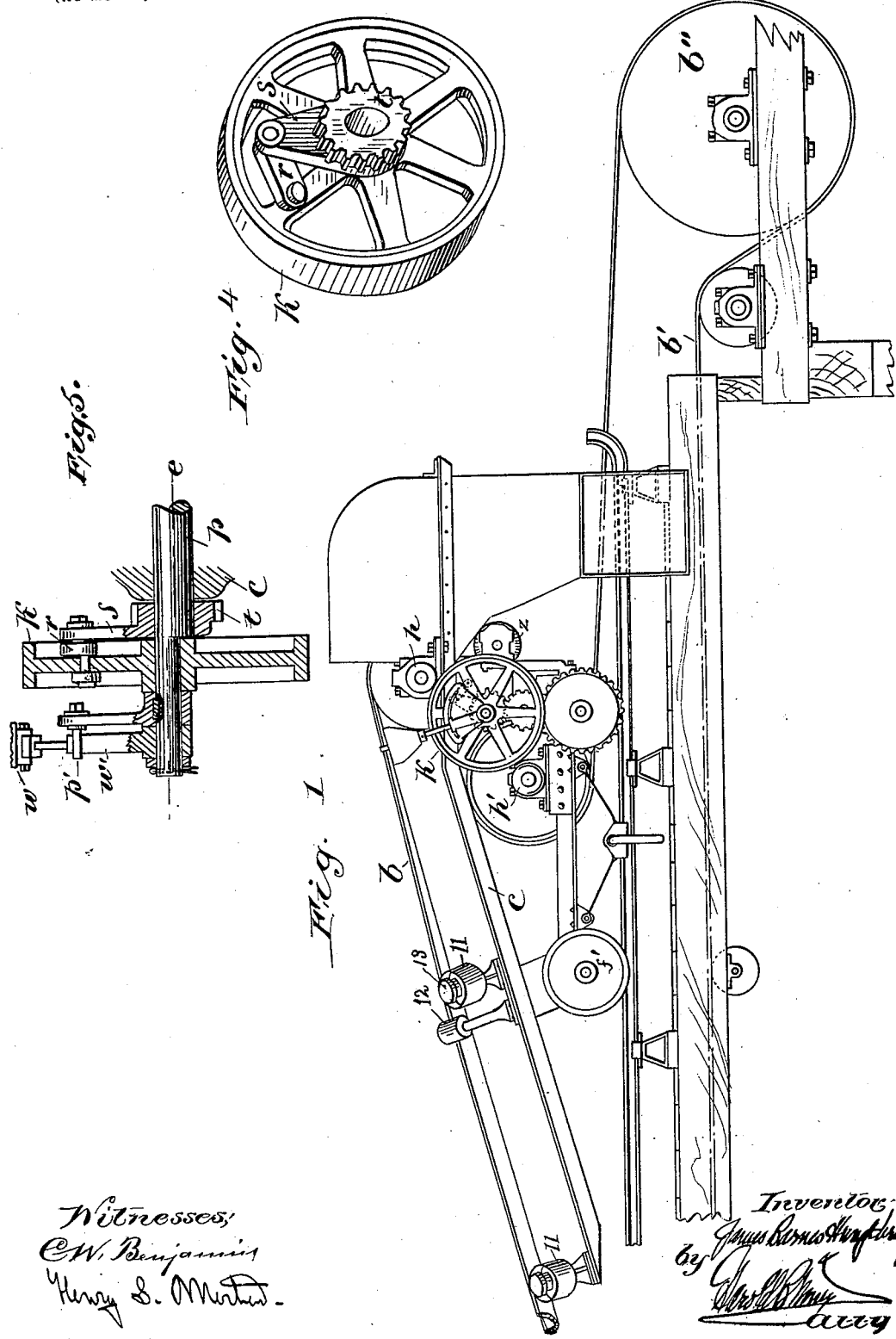

No. 673,539. Patented May 7, 1901.
J. B. HUMPHREYS.
TRIPPER OR DELIVERER FOR CONVEYING APPARATUS.
(Application filed May 24, 1900.)
(No Model.) 4 Sheets—Sheet 2.
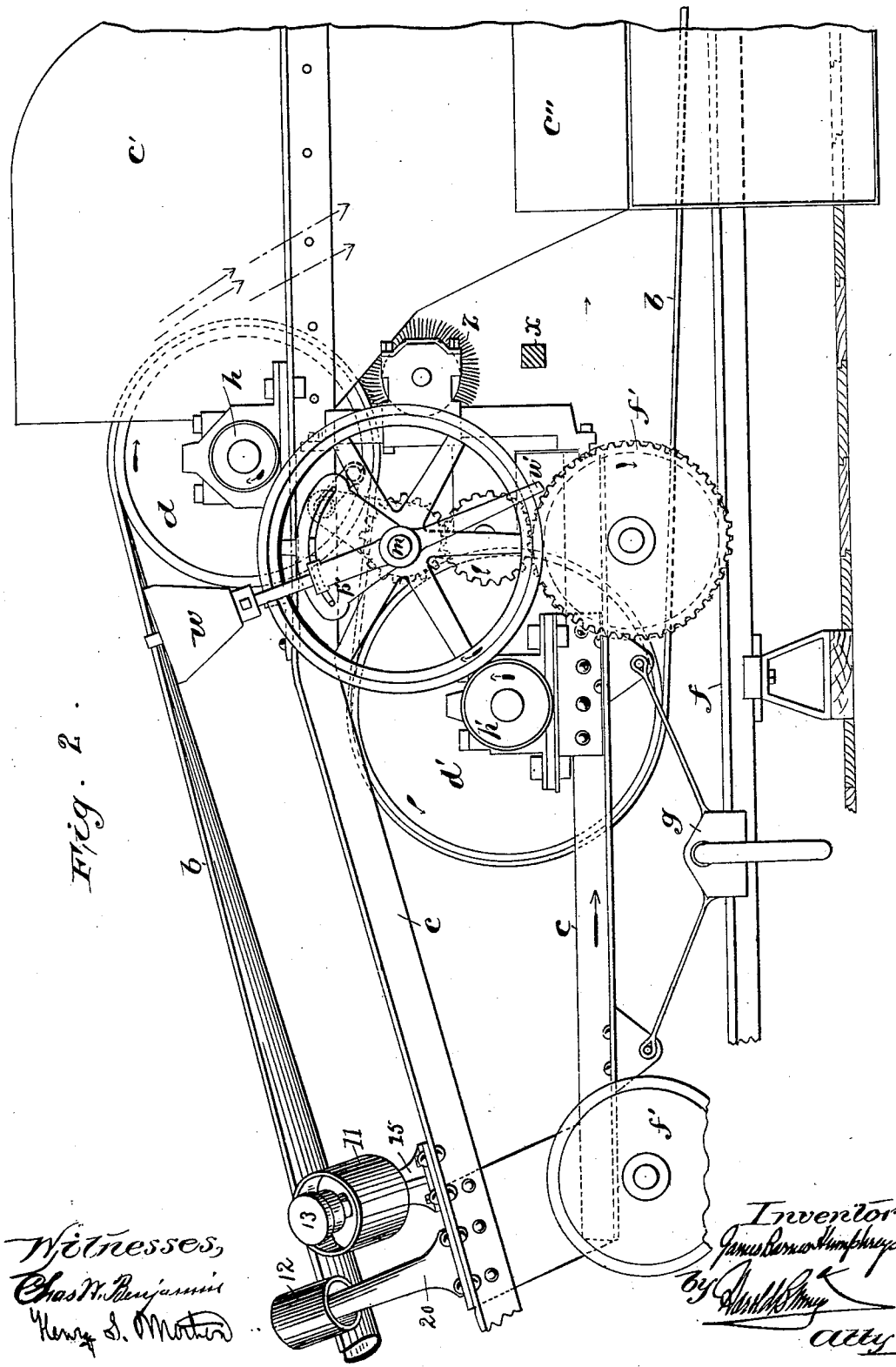

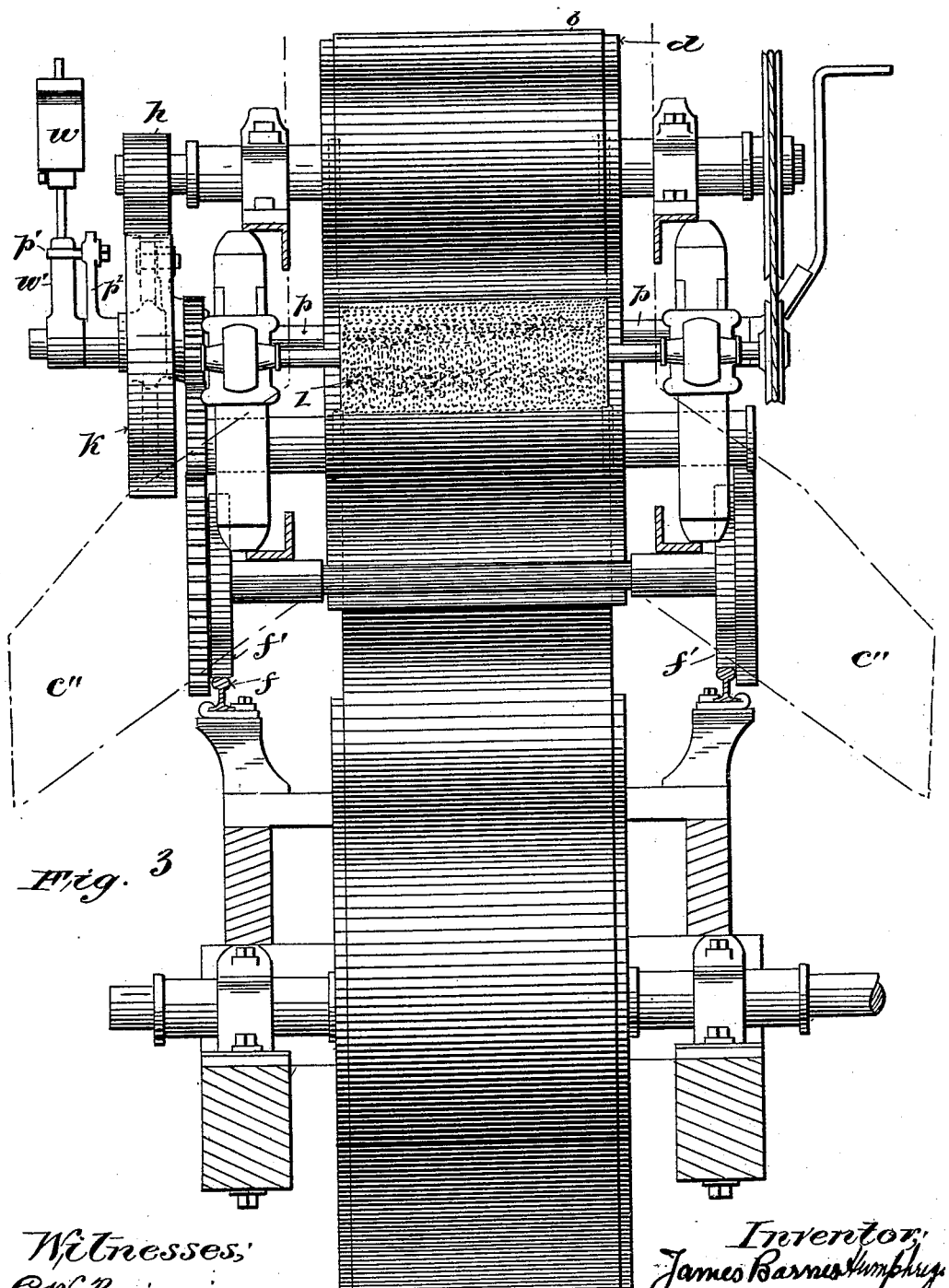

UNITED STATES PATENT OFFICE.

JAMES BARNES HUMPHREYS, OF NEW YORK, N. Y., ASSIGNOR TO THE ROBINS CONVEYING BELT COMPANY, OF NEW JERSEY.

TRIPPER OR DELIVERER FOR CONVEYING APPARATUS.

SPECIFICATION forming part of Letters Patent No. 673,539, dated May 7, 1901.

Application filed May 24, 1900. Serial No. 17,804. (No model.)

*To all whom it may concern:*

Be it known that I, JAMES BARNES HUMPHREYS, of 146 East Thirty-seventh street, in the city of New York, borough of Manhattan, and State of New York, have invented certain new and useful Improvements in Trippers or Deliverers for Conveying Apparatus, such as Conveying-Belts, of which the following is a specification, referring to illustrated drawings.

Where broken, granular, or other materials are being carried from one point to another—as, for example, by a conveying-belt—it is often desirable to deliver the material from the belt before reaching the extreme end, and it is not desirable to mechanically remove the material by brushing it or scraping it off the belt transversely or by inclining the belt so as to cause it to deliver sidewise by gravity. The present invention relates to means for delivering the material in a manner free from all these objections.

Although the invention is capable of considerable variation, in its preferred form it possesses the following advantageous features: A conveying-belt is used. The belt at the tripper or deliverer runs downward and rearward around an idler-pulley, and then at a lower level turns back—*i. e.*, forward—into its normal line of travel. At the tripper or deliverer therefore the belt makes an ogee or goosenecked curve like the letter "S," and the material on the belt falls off as it passes around the upper pulley and would be delivered back onto the belt beneath if allowed to; but I interpose a chute that catches the falling material and delivers it clear of the belt. Furthermore, these two idler-pulleys and the chute may be mounted in a movable frame preferably running on tracks or guides, so that the point of delivery can be varied lengthwise of the belt at will. This may be done manually, or where conditions make it advantageous I may utilize the movement of the idlers to give travel to the frame of the tripper or deliverer, and thus cause it to deliver along a line of bins and distribute the material very evenly. The travel may be stopped and reversed manually or automatically.

The present invention therefore is directed to the creation and perfecting of means for accomplishing the objects which I have just enumerated and some of which appear to be entirely novel.

Certain other objects are also accomplished and will be understood from the following detailed description of certain embodiments of the invention.

In the drawings, Figure 1 is a side elevation of a very complete form of my invention and combining all the features which I have enumerated. Fig. 2 is a larger view of the same thing, showing certain other features. Fig. 3 is a detailed end view with the hood and apron and delivery-chutes omitted and some parts shown in section. Figs. 4 and 5 are detailed views of parts of the connections for giving travel to the tripper. Fig. 6 is a side view of parts of a slightly-modified construction of tripper.

The belt $b$ in Figs. 1, 2, and 6 is supposed to be driven and running toward the right. The return portion of the belt $b'$ after passing around the fixed pulley $b''$ is shown only in Fig. 1 and does not concern the present invention. The frame of the tripper is marked $c$, the hood $c'$, and the delivery-chute $c''$. The two idler-pulleys $d$ and $d'$, which serve as driving-pulleys for the travel of the tripper and derive their power from the belt, are mounted in the frame, so as to cause the belt to make the ogee or gooseneck curve, like a reversed letter S, as clearly seen in the figures. Consequently the material which is carried by the belt up to and over the pulley $d$ is delivered into the hood $c'$ and chute $c''$, and thus removed from the belt. If desired, a rotary brush $z$, driven from one of the pulleys—for example, by a rope connection, as shown at the right of Fig. 3—may be applied to the inverted carrying-face of the belt to brush it off in order principally to save wear between the surface of the belt and the pulley $d'$.

In order to provide for the travel of the tripper, rails $f$, supporting flanged wheels $f'$, are employed, and in order to prevent the accidental traveling of the tripper a rail-lock $g$, of any suitable form, is provided, by which the tripper may be locked fast to the rails when travel is not desired.

The tripper may of course be manually moved along the rail; but automatic means for giving the travel are shown in the drawings. As Fig. 6 is on a larger scale than Fig. 2, I will first explain these means in connection with Fig. 6. Each of the pulleys $d$ $d'$ carries on the end of the shaft a friction-pulley $h$ $h'$, and against these the inner surface of the rim of the large wheel $k$ is adapted to be pressed, so that by the slight movement of the center of the wheel transversely of its axis either one of the friction-pulleys $h$ $h'$ may be made to drive the wheel $k$ at will in either direction, or at the intermediate position of the wheel it may be free of both these friction-pulleys. In practice I have given an adjustment of one-half an inch to an inch at the center of wheel $k$ in order to throw it into frictional engagement with either of the friction-pulleys $h$ $h'$. The wheel $k$ turns loosely on the shaft $m$; but the shaft $m$ is itself mounted on the end of shaft $p$, which turns around an axis $e$, so that by turning shaft $p$ ninety degrees the shaft $m$ is moved transversely of its length sufficiently to take the wheel $k$ out of engagement with one of the friction-pulleys $h$ $h'$ and into engagement with the other. Leaving for a moment the means for producing this adjusting or reversing movement of the apparatus, I will trace the connections by which the wheel $k$ drives the tripper along its track in one or the other direction corresponding to the rotation of the wheel $k$ in one or the other direction. In Fig. 6 arrows indicate the movement of the belt and the consequent movement of the pulleys $h$ $h'$. Supposing the pulley $h$ is in contact with the wheel $k$, then the wheel $k$ will be turned right-handedly. The wheel $k$ is connected by a link $r$ and crank-arm $s$ with a gear-wheel $t$, which turns upon the fixed axis or axial line $e$. It is only because of the slight difference or eccentricity of the shaft $m$ as compared with the gear-wheel or pinion $t$ that the link-and-crank connections $r$ $s$ are employed. Various other means may be employed as well-known equivalents. For example, the pin which connects the link $r$ and the wheel $k$ may rest against a radial surface on the crank $s$ or lie in a radial slot and the link $r$ be entirely omitted. Moreover, as the gear or pinion $t$ is used to turn the larger gear-wheel $t'$ and one of the pairs of track-wheels $f'$, and so give motion to the frame of the tripper, it is obvious that the slight movement of approach and recession between the shaft $m$ and the gear-wheel $t'$ is so very small that the shaft $m$ may be directly geared to the gear-wheel $t'$, (with only a negligible departure from strictly accurate mechanical principles if the gear-wheels have epicycloidal teeth and with obsolutely no departure from strictly accurate mechanical principles if involute gear-teeth are used.) The drawings may be considered as showing either form of teeth.

Returning now to a consideration of the adjusting movement of the shaft $m$, the shaft $p$ is mounted in the fixed frame of the machine so as to turn about the fixed center or axis $e$, and it is rigidly connected with a sector-shaped or fan-shaped piece $p''$, which is slotted, as shown, for purposes that will presently appear. Obviously the turning of this sector-piece $p''$ and its connected shaft $p$ through an angle of about ninety degrees in either direction will displace the shaft $m$, and consequently the wheel $k$, and cause the wheel $k$ to press against one or the other of the friction-pulleys $h$ $h'$, as previously explained. Therefore the stopping or reversing of the travel of the whole tripper apparatus may be accomplished manually by turning the piece $p''$, and I sometimes provide a handle or crank, as shown at the right of Fig. 3, on the shaft $p$ for this object. To accomplish it automatically, I provide a heavy weight $w$, secured on a loose crank-arm $w'$, which is free to turn on the shaft $m$ between the pins $p'$, adjustably fixed in the slot in the sector-shaped piece $p''$. This weight $w$ or its arm $w'$ strikes a fixed obstacle as the tripper travels along the track, and the weight $w$ is thereby arrested until the shaft $m$ passes under its center of gravity. Then the weight $w$ falls heavily with its crank-arm $w'$, and when the arm $w'$ strikes the pin $p'$ in the slot in the piece $p''$ it turns the piece $p''$ to the end of its movement, thereby shifting the center of the wheel $k$ and causing it to be driven in a reverse direction. In Fig. 6 the parts are shown in position at the moment when the tripper reaches the extreme left hand of the travel. The weight $w$ is falling toward the right and is about to adjust the piece $p''$ toward the right, carrying the rim of the wheel $k$ out of contact with the pulley $h$ and into contact with the wheel $h'$, and thereby reversing the rotation of the wheel $k$, and consequently of wheel $f'$, that runs on the rail $f$. As shown, the wheel $k$ may be supposed to be still turning, as shown by the arrow, causing the wheel $f'$ to turn left-handedly and carry the whole apparatus toward the left; but an instant later these conditions will be reversed. I show at $x$ an obstruction which may be supposed to have interfered with the weight $w$ and tilted it over by the movement of the tripper.

Figs. 4 and 5 serve to illustrate parts of the mechanism shown both in Fig. 6 and in Figs. 1, 2, and 3. The principal difference between Fig. 6 and these latter figures lies merely in the fact that the pulleys $h$ $h'$ in Fig. 6 press interiorly against the rim of the wheel $k$, while in Figs. 1, 2, and 3 they press exteriorly against it. It will not therefore be necessary to enter into detail in connection with Figs. 1, 2, and 3 further than has been already done in the previous explanation.

Having now described the preferred forms of my invention that carry out all the objects enumerated, it will be readily understood that some of the features of my invention may be used without others and in various modifications.

I desire to claim as the novel and characteristic features of my invention the following:

1. In combination in a tripper or deliverer for conveyers, and with the frame thereof, a plurality of idler-pulleys around which the belt runs, and over one of which the material is delivered from the belt, a chute interposed to receive the material and deliver it clear of the belt, and a means actuated by said belt-pulleys for giving automatic travel to the tripper, substantially as set forth.

2. In combination in a tripper or deliverer for conveyers, and with the frame thereof, a plurality of idler-pulleys around which the belt runs, and over one of which the material is delivered from the belt, a chute interposed to receive the material and deliver it clear of the belt, and one or more driving-wheels and means for actuating the driving-wheels for giving travel to the said tripper, substantially as set forth.

3. In combination in a tripper or deliverer for conveyers, and with the frame thereof, a plurality of idler-pulleys around which the belt runs, and over one of which the material is delivered from the belt, a chute interposed to receive the material and deliver it clear of the belt, one or more driving-wheels for giving travel to the tripper, and connections between the idlers and the driving wheel or wheels for actuating the latter, substantially as set forth.

4. In combination in a tripper or deliverer for conveyers, and with the frame thereof, a plurality of idler-pulleys around which the belt runs, and over one of which the material is delivered from the belt, a chute interposed to receive the material and deliver it clear of the belt, one or more driving-wheels for giving travel to the tripper, and reversible connections between the idlers and the driving wheel or wheels for actuating the latter, substantially as set forth.

5. In combination in a tripper or deliverer for conveyers, and with the frame thereof, a plurality of idler-pulleys around which the belt runs, and over one of which the material is delivered from the belt, a chute interposed to receive the material and deliver it clear of the belt, one or more driving-wheels for giving travel to the tripper, frictional connections for driving the said wheel or wheels from the said pulleys, and reversing mechanism therefor, and means for controlling said reversing mechanism by the travel or movement of the said tripper, substantially as set forth.

6. In combination in a tripper or deliverer for conveyers, and with the frame thereof, a plurality of idler-pulleys around which the belt runs, and over one of which the material is delivered from the belt, a chute interposed to receive the material and deliver it clear of the belt, said tripper being mounted to travel bodily on guides, propelling devices which are mounted on and travel with the said tripper or deliverer for propelling it, substantially as set forth.

7. A tripper or deliverer for a conveying-belt provided with idler-pulleys mounted upon its frame and over which the belt runs, and mechanically-driven brushing apparatus connected to be driven from at least one of the said idlers by the power derived from the belt itself, substantially as set forth.

8. A tripper or deliverer for a conveying-belt provided with idler-pulleys over which the belt runs, and a means actuated by the one or more of said idler-pulleys for giving travel to the tripper, substantially as set forth.

9. A tripper or deliverer for a conveying-belt provided with idler-pulleys over which the belt runs, a friction-driven wheel, two friction-pulleys driven from the said belt and driving said wheel in opposite directions, connections from said wheel for giving travel to the tripper, and means for moving said wheel into and out of engagement with said friction-pulleys, substantially as set forth.

10. A tripper or deliverer for a conveying-belt provided with idler-pulleys over which the belt runs, a friction-driven wheel, two friction-pulleys driven from the said belt and driving said wheel in opposite directions, connections from said wheel for giving travel to the tripper, and an arm and connections for moving said wheel into and out of engagement with said pulleys, substantially as set forth.

11. A tripper or deliverer for a conveying-belt provided with idler-pulleys over which the belt runs, a friction-driven wheel, two friction-pulleys driven from the said belt and driving said wheel in opposite directions, connections from said wheel for giving travel to the tripper, and an arm and connections for moving said wheel into and out of engagement with said pulleys, said arm having a lost-motion connection whereby it may acquire momentum before acting, substantially as set forth.

12. A tripper or deliverer for a conveying-belt provided with idler-pulleys over which the belt runs, a friction-driven wheel, two friction-pulleys driven from the said belt and driving said wheel in opposite directions, connections from said wheel for giving travel to the tripper, and an arm and connections for moving said wheel into and out of engagement with said pulleys, said arm being weighted to act automatically when displaced beyond its center of gravity for the purposes set forth.

Signed this 16th day of April, 1900, at New York, N. Y.

JAMES BARNES HUMPHREYS.

Witnesses:
EDWARD A. FRESHMAN,
HAROLD BINNEY.